Feb. 7, 1961            G. B. WARREN            2,970,434
STEAM-GAS TURBINE POWERPLANT WITH STEAM COMPRESSOR
Filed June 28, 1955
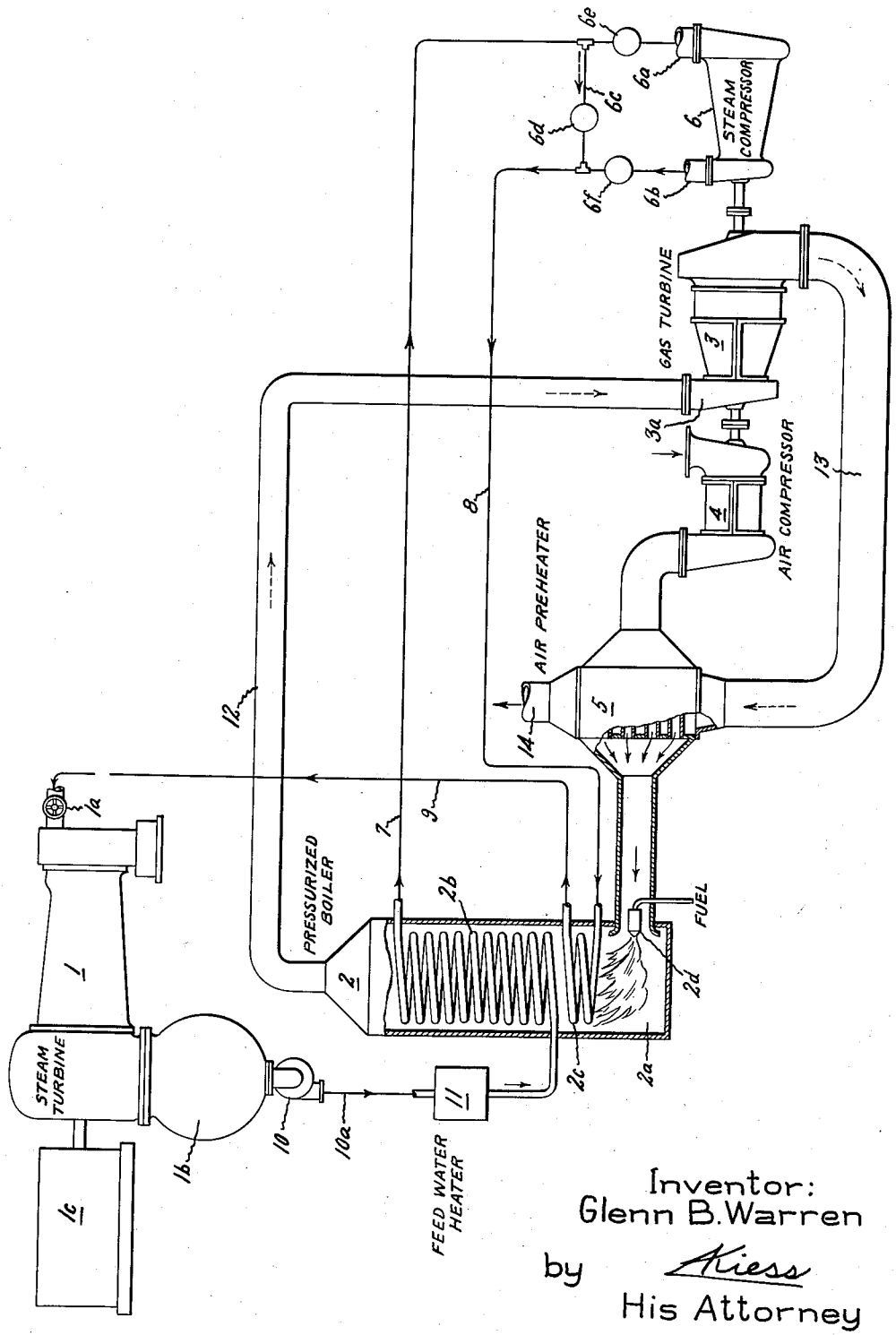
Inventor:
Glenn B. Warren
by    Kiess
His Attorney

United States Patent Office 2,970,434
Patented Feb. 7, 1961

2,970,434

STEAM-GAS TURBINE POWERPLANT WITH STEAM COMPRESSOR

Glenn B. Warren, Schenectady, N.Y., assignor to General Electric Company, a corporation of New York Filed June 28, 1955, Ser. No. 518,612

5 Claims. (Cl. 60—39.18)

This invention relates to combined steam and gas turbine thermal powerplants, particularly to one in which the useful net output of the power plant is generated by steam turbines and special means are employed to transfer into the steam portion of the cycle all excess power generated in the gas turbine portion of the cycle.

As the temperatures and pressures employed in conventional steam turbine powerplants have approached the maximum possible with available materials and design techniques, increasing attention has been given to the gains to be obtained by combining steam turbine cycles with gas turbine cycles, in various ways. One particularly interesting feature of such combined plants is the so-called "pressurized boiler," in which steam is produced by hot combustion products generated at a substantial super-atmospheric pressure, for instance, on the order of 50 to 100 p.s.i.a. The use of such high pressure heating medium results in greatly improved heat transfer to the water, at the same time permitting a very substantial reduction in size of the combustion chamber and heat exchangers of the steam generator. It has previously been suggested that the high pressure combustion air required for such a steam generation process be supplied by an air compressor driven by a gas turbine using as its motive fluid the hot pressurized heating medium discharged from the steam generator. However, the efficiency of the modern gas turbine has been improved to the point where it is capable of delivering much more mechanical energy than that required to drive the air compressor. Therefore, the problem arises how to make most effective use of this extra energy.

Accordingly, an object of the present invention is to provide a steam and gas turbine thermal powerplant with improved means for returning to the steam portion of the cycle any excess mechanical energy developed by the gas turbine over that required to drive the air compressor.

A further object is to provide an improved steam-gas turbine powerplant of the type described which is especially suitable for use as a marine powerplant because of its high output, small size, and comparatively light weight.

Other objects and advantages will become apparent from the following description taken in connection with the accompanying drawing, in which the single figure represents schematically the arrangement of a gas-steam turbine powerplant in accordance with the invention.

Generally stated, the invention is practiced by utilizing excess power generated by the gas turbine, over that required to drive the air compressor, to drive a steam compressor which increases the pressure in the steam portion of the cycle.

Referring now more particularly to the drawing, the invention is illustrated as applied to a combined steam-gas turbine plant having one or more steam turbines, represented by the single turbine 1. The pressurized steam generator 2 supplies high pressure steam to turbine 1, and high pressure combustion products to the gas turbine 3. The gas turbine drives a suitable air compressor 4, which supplies the compressed combustion air to steam generator 2. To improve the thermal efficiency of the gas turbine portion of the cycle, the high pressure air from compressor 4 may be preheated in a suitable heat exchanger or regenerator 5 before being admitted to the combustion chamber 2a of steam generator 2. Fuel is introduced into the combustion chamber by a suitable burner or nozzle 2d.

In accordance with the invention, the gas turbine is also connected to drive a steam compressor, illustrated diagrammatically at 6.

The steam turbine portion of the cycle is as follows. The steam generator 2 includes the combustion chamber 2a and two separate heat exchangers identified 2b, 2c. The first heat exchanger 2b is the primary steam generating element, and discharges substantially saturated steam, perhaps at a pressure of 1000 p.s.i.a. and temperature of 550° F., through conduit 7 to the inlet 6a of the steam compressor 6. The outlet 6b of the steam compressor is connected by conduit 8 to discharge steam at a pressure of perhaps 1300 p.s.i.a. and temperature of 600° F. to the inlet of the secondary heat exchanger 2c. The outlet of this heat exchanger is connected by conduit 9 to discharge steam at perhaps 1200 p.s.i.a. and 1000° F. to the inlet of turbine 1, which of course will be provided with suitable control valve gear indicated diagrammatically at 1a. Spent steam is returned to the liquid state in condenser 1b and returned by boiler feed pump 10 to the inlet of the primary heat exchanger 2b, by way of conduit 10a. It will be appreciated by those skilled in the art that numerous conventional components of steam turbine powerplants have been omitted. Illustrated diagrammatically at 11 is a feed-water heater, furnishing water at a temperature of perhaps on the order of 250° F. to the heating coil 2b. In an actual plant, the single feed-water heater 11 might be an "economizer" heated by waste heat from the gas turbine portion of the cycle, or by steam extracted from the turbine 1 or derived from other suitable sources, as is well known in the art. Similarly, the turbine 1 might actually be a number of high pressure, intermediate pressure, and low pressure turbines, in series, arranged in any suitable manner, with or without reheating between turbines.

The gas turbine portion of the cycle is as follows. Conduit 12 supplies spent heating medium from the steam generator 2 at a temperature of perhaps 1400° F. and pressure of about 2 to 5% less than the air compressor discharge pressure, to the inlet 3a of the gas turbine 3. Exhaust conduit 13 conducts the hot gases, which may still be at a temperature on the order of 1000° F., to heat exchanger 5 which serves as a preheater for the pressurized combustion air. The combustion products are discharged through stack 14 which, as noted above, may have associated therewith additional heat exchangers to transfer thermal energy to the feedwater, or extract for other useful purposes heat remaining in the combustion products.

For control purposes, the by-pass conduit 6c is provided between the steam compressor inlet 6a and the outlet conduit 6b. This by-pass has suitable valve means identified 6d, the functioning of which will be seen from the following. Additional shut-off valves 6e, 6f may also be provided to positively prevent circulation of steam through the compressor 6 when by-pass valve 6d is open.

The operation of the powerplant may be outlined as follows.

In starting, the valve 6d will be opened (and valves 6e, 6f closed) so as to unload compressor 6, and the gas turbine rotor will be turned by any suitable means (not shown), for instance an electric starting motor or by auxiliary motive fluid, such as steam or compressed air from an external source admitted to a portion of the nozzle arc of the gas turbine 3. Such expedients for starting gas turbine power plants are well known in the art and the specific details thereof are not material to an understanding of the present invention. When the compressor 4 supplies air at suitable pressure to the combustion chamber 2a, fuel is admitted to nozzle 2d and combustion initiated. Meanwhile, the feed pump 10 has been started and water is supplied to the primary steam generating coil 2b. With valve 6d still open, steam from conduit 7 will by-pass the compressor 6 and return through conduit 8 to the "superheater" coil 2c.

The gas turbine portion of the cycle may be so designed that, at "idling" conditions, the power output of the gas turbine 3 is just enough to drive the air compressor 4. This condition would of course correspond to minimum energy input to the steam portion of the cycle. When it is desired to increase the useful power output of the steam turbine 1, the valve 6d will be closed, and the input of fuel to nozzle 2d concurrently increased. The additional energy thus made available to the gas turbine 3 will produce the power required to drive the steam compressor 6. At the same time, increased combustion temperatures in the steam generator 2 will result in increasing temperature of the steam supplied to turbine 1, or the boiler and firing controls may be arranged so the rate of steam flow increases with no increase in steam supply temperature.

The function of the steam compressor 6 is to return to the steam portion of the cycle any excess power generated by gas turbine 3, in the form of increased pressure energy added to the steam.

The invention provides a high efficiency steam-gas turbine powerplant capable of being designed with minimum size and weight. The use of high pressure combustion air, at a pressure which may be on the order of 50 to 100 p.s.i.a., permits a very substantial reduction in the size and weight of the steam generator. The combustion chamber pressure can be selected as any value found to produce the most economically feasible mechanical and thermal design for the steam generator, since the pressure energy of the heating medium can be effectively recovered by the gas turbine 3 and returned by the compressor 6 to the steam portion of the cycle, which produces the net useful power output.

Thus, the invention provides a particularly effective way to combine gas turbine and steam turbine cycles with a minimum of extra complexity, the only new component required being the steam compressor 6. The result is a highly versatile powerplant readily adaptable to many modifications, and particularly useful as a marine powerplant because of its compactness and light weight.

While only one form of the invention has been described specifically herein, it will be appreciated by those skilled in the art that the invention lends itself to many alterations and substitutions of equivalents. The precise arrangement of the combustion system, and of the heat exchanger elements, may obviously take many forms. The steam compressor may be either an axial flow compressor or a suitable type of positive displacement compressor; although ordinarily the characteristics of the axial flow compressor will make it more readily adaptable to direct connection to the gas turbine. As suggested above, the auxiliary means for utilizing waste heat in the gas turbine exhaust and the means for adding heat to the boiler feed-water may take many forms. It is also possible to compound the invention, as by leading the steam from the exhaust end of turbine 1 back to another compressor like 6, then through a reheater like heat exchanger 2c and to a second turbine like 1, and then to the condenser 1b.

It is of course intended to cover by the appended claims all such modifications as fall within the true spirit and scope of the invention.

What I claim as new and desire to secure by Letters Patent of the United States is:

1. In a steam and gas turbine powerplant, the combination of at least one steam turbine and means for generating high pressure steam including a combustion chamber for burning fuel under pressure and first and second heat exchanger means, the first heat exchanger being constructed and arranged to produce steam at a pressure substantially below the inlet pressure of the steam turbine and the second heat exchanger being connected to supply steam at said inlet pressure to the steam turbine, means for supplying air under pressure to the combustion chamber including an air compressor driven by a gas turbine, first conduit means connected to supply hot gas from the combustion chamber to drive the gas turbine, a steam compressor connected to be driven by said gas turbine, second conduit means connected to supply steam from the outlet of the first heat exchanger to the inlet of the steam compressor, and third conduit means connected to supply compressed steam from the outlet of the steam compressor to the inlet of the second heat exchanger.

2. In a steam and gas turbine powerplant, the combination of at least one steam turbine and means for generating high pressure steam including first and second heat exchangers, the first heat exchanger being constructed and arranged to produce steam at a pressure substantially less than the inlet pressure of the steam turbine, the second heat exchanger being connected to supply steam at said inlet pressure to the steam turbine, means including an air compressor and combustion means connected to supply hot combustion gases to the steam generator and a gas turbine connected to drive the air compressor and constructed and arranged to receive hot gases generated in said combustion means and to produce excess power over that required to drive the air compressor, a steam compressor connected to be driven by said gas turbine for absorbing the excess power output thereof, first conduit means connecting the outlet of the first heat exchanger to the inlet of the steam compressor, and second conduit means connecting the outlet of the steam compressor to the inlet of the second heat exchanger, whereby excess power generated by the gas turbine is returned to the steam portion of the cycle by pressure energy added to the steam by the steam compressor.

3. In a steam and gas turbine powerplant, the combination of at least one steam turbine and means for generating high pressure steam including heat exchanger means for transferring heat to water from hot combustion products, a gas turbine power plant including a gas turbine, combustion means for generating hot heating gases, means for supplying air under pressure to the combustion chamber including an air compressor driven by said gas turbine, the gas turbine being constructed and arranged to receive said hot heating gases generated in said combustion means to be driven thereby to produce more power than that required to drive the air compressor, a steam compressor connected to the gas turbine to absorb the excess power output thereof, and conduit means connecting the steam compressor in series between at least a portion of the heat exchanger means and the steam turbine, whereby the steam compressor returns to the steam portion of the cycle the excess power generated by the gas turbine in the form of increased pressure energy added to the steam.

4. In a steam and gas turbine powerplant, the combination of at least one steam turbine and means for generating high pressure steam including heat exchanger means constructed and arranged to generate steam and connected to supply it to the inlet of said steam turbine, means including an air compressor and combustion means connected to supply hot combustion gases to the steam generator, a gas turbine connected to drive the air compressor and constructed and arranged to receive hot gases generated in said combustion means and to produce excess power over that required to drive the air compressor, a steam compressor connected to be driven by said gas turbine for absorbing the excess power output thereof, and conduit means for circulating steam from the steam generator through said steam compressor, whereby excess power generated by the gas turbine is returned to the steam portion of the cycle by pressure energy added to the steam in said steam compressor.

5. In a steam pressure generating plant, the combination of discharge conduit means for supplying steam at a given discharge pressure, heat exchanger means for transferring heat to water from a heating fluid to generate steam at a pressure below said given discharge pressure, means for generating a heating fluid including a reaction chamber and a first compressor driven by a gas turbine, the first compressor being connected to supply gas under pressure to the reaction chamber, the reaction chamber being connected to supply heating fluid to the heat exchanger, means connecting exhaust heating fluid from said reaction chamber to drive said gas turbine, the gas turbine being constructed and arranged to produce more power than that required to drive the first compressor, a steam compressor connected to the gas turbine to absorb the excess power output thereof, and conduit means connecting said steam compressor in series between at least a portion of the heat exchanger means and said discharge conduit of the plant, whereby the steam compressor converts into pressure energy in the steam the excess power generated by the gas turbine.

References Cited in the file of this patent

UNITED STATES PATENTS

| | | |
|---|---|---|
| 913,330 | Wadagaki | Feb. 23, 1909 |
| 1,563,690 | Cristeiani | Dec. 1, 1925 |
| 1,978,837 | Forsling | Oct. 30, 1934 |
| 2,663,145 | Waeselynck | Dec. 22, 1953 |
| 2,294,700 | Stroehlen | Sept. 1, 1942 |